(12) United States Patent
Jones et al.

(10) Patent No.: US 6,840,843 B2
(45) Date of Patent: Jan. 11, 2005

(54) METHOD FOR MANUFACTURING A POLISHING PAD HAVING A COMPRESSED TRANSLUCENT REGION

(75) Inventors: Jeremy Jones, St. Charles, IL (US); Roland K. Sevilla, Aurora, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 34 days.

(21) Appl. No.: 10/083,985

(22) Filed: Feb. 27, 2002

(65) Prior Publication Data

US 2002/0123300 A1 Sep. 5, 2002

Related U.S. Application Data

(60) Provisional application No. 60/272,691, filed on Mar. 1, 2001.

(51) Int. Cl.$^7$ .................................................. B24B 1/00
(52) U.S. Cl. ............................... 451/41; 451/6; 451/8; 451/526; 451/529; 451/533; 451/534; 264/40.06; 264/327; 264/328.1; 264/328.16
(58) Field of Search ....................... 451/6, 8, 41, 526, 451/529, 533, 534; 264/40.06, 327, 328.1, 328.16

(56) References Cited

U.S. PATENT DOCUMENTS

| | | | |
|---|---|---|---|
| 4,728,559 A | | 3/1988 | Hardenbrook et al. |
| 4,927,432 A | * | 5/1990 | Budinger et al. ............. 51/298 |
| 5,433,651 A | * | 7/1995 | Lustig et al. .................. 451/6 |
| 5,489,233 A | | 2/1996 | Cook et al. |
| 5,605,760 A | | 2/1997 | Roberts |
| 5,893,796 A | | 4/1999 | Birang et al. |
| 5,964,643 A | | 10/1999 | Birang et al. |
| 6,017,265 A | | 1/2000 | Cook et al. |
| 6,022,268 A | | 2/2000 | Roberts et al. |
| 6,036,579 A | | 3/2000 | Cook et al. |
| 6,045,439 A | | 4/2000 | Birang et al. |
| 6,062,968 A | | 5/2000 | Sevilla et al. |
| 6,099,394 A | | 8/2000 | James et al. |
| 6,106,754 A | | 8/2000 | Cook et al. |
| 6,126,532 A | | 10/2000 | Sevilla et al. |
| 6,146,242 A | | 11/2000 | Treur et al. |
| 6,146,248 A | | 11/2000 | Jairath et al. |
| 6,168,508 B1 | | 1/2001 | Nagahara et al. |
| 6,171,181 B1 | | 1/2001 | Roberts et al. |
| 6,179,709 B1 | | 1/2001 | Somekh et al. |
| 6,231,434 B1 | | 5/2001 | Cook et al. |
| 6,254,459 B1 | | 7/2001 | Bajaj et al. |
| 6,280,290 B1 | | 8/2001 | Birang et al. |
| 6,287,185 B1 | | 9/2001 | Roberts et al. |
| 6,293,852 B1 | | 9/2001 | Roberts et al. |
| 6,325,703 B2 | | 12/2001 | Cook et al. |
| 6,358,130 B1 | | 3/2002 | Freeman et al. |
| 6,387,312 B1 | * | 5/2002 | Roberts et al. ........ 264/328.16 |
| 6,537,134 B2 | * | 3/2003 | Newell .......................... 451/6 |
| 2001/0036805 A1 | | 11/2001 | Birang et al. |

FOREIGN PATENT DOCUMENTS

| | | |
|---|---|---|
| WO | WO 01/23141 A1 | 4/2001 |
| WO | WO 01/62440 A1 | 8/2001 |
| WO | WO 01/68322 A1 | 9/2001 |
| WO | WO 01/94074 A1 | 12/2001 |

* cited by examiner

*Primary Examiner*—Joseph J. Hail, III
*Assistant Examiner*—Shantese McDonald

(57) ABSTRACT

A method for producing a polishing pad comprising (a) providing a porous polymer structure, (b) compressing at least a region of the porous polymer structure to provide a translucent region, and (c) forming a polishing pad comprising the porous polymer structure, whereby a polishing pad is produced comprising the translucent region. Also provided is a polishing pad produced according to this method, and a polishing pad comprising a region that is at least translucent, wherein the translucent region is porous, as well as a method of polishing a substrate using a pad of the invention.

29 Claims, No Drawings

METHOD FOR MANUFACTURING A POLISHING PAD HAVING A COMPRESSED TRANSLUCENT REGION

This application claims the benefit of Provisional Application Ser. No. 60/272,691, filed Mar. 1, 2001.

TECHNICAL FIELD OF THE INVENTION

This invention pertains to a method for producing a polishing pad comprising a compressed region that is at least translucent to light, a polishing pad produced thereby, and a method of using such a polishing pad.

BACKGROUND OF THE INVENTION

In polishing the surface of a substrate, it is often advantageous to monitor the polishing process in situ. One method of monitoring the polishing process in situ involves the use of a polishing pad having an aperture or window. The aperture or window provides a portal through which light can pass to allow the inspection of the substrate surface during the polishing process. Polishing pads having apertures and windows are known and have been used to polish substrates, such as semiconductor devices. For example, U.S. Pat. No. 5,605,760 (Roberts) provides a pad having a transparent window formed from a solid, uniform polymer, which has no intrinsic ability to absorb or transport slurry. U.S. Pat. No. 5,433,651 (Lustig et al.) discloses a polishing pad wherein a portion of the pad has been removed to provide an aperture through which light can pass. U.S. Pat. Nos. 5,893,796 and 5,964,643 (both by Birang et al.) disclose removing a portion of a polishing pad to provide an aperture and placing a transparent polyurethane or quartz plug in the aperture to provide a transparent window, or removing a portion of the backing of a polishing pad to provide a translucency in the pad.

Still, there remains a need for effective polishing pads comprising translucent regions, as well as methods for the production and use of such polishing pads. The invention provides such a polishing pad and methods of production and use. These and other advantages of the present invention, as well as additional inventive features, will be apparent from the description of the invention provided herein.

BRIEF SUMMARY OF THE INVENTION

The present invention provides a method for producing a polishing pad comprising (a) providing a porous polymer structure, (b) compressing at least a region of the porous polymer structure to provide a translucent region, and (c) forming a polishing pad comprising the porous polymer structure, whereby a polishing pad is produced comprising the translucent region. Steps (b) and (c) can be performed in any order. The present invention further provides a polishing pad made according to this method and a polishing pad comprising a region that is at least translucent, wherein the translucent region is porous, as well as a method of polishing a substrate using the pad of the present invention.

DETAILED DESCRIPTION OF THE INVENTION

The present invention involves the use of a porous polymer structure, which is compressed to form a translucent region and formed into a polishing pad. The porous polymer structure used in conjunction with the present invention can comprise any suitable polymer known in the art capable of providing a porous structure (i.e., containing a plurality of pores, voids, passages, channels, or the like, of any size or shape), either by its natural configuration or through the use of various production techniques known in the art (e.g., foaming, blowing, etc.). Suitable porous polymers include porous urethanes, acrylics, nylons, epoxies, and other polymers known in the art. A preferred porous polymer comprises, consists essentially of, or consists of, a thermoplastic polymer, particularly polyurethane. The porous polymer structure can be provided by any suitable means. One such method involves sintering particles of a thermoplastic polymer, such as polyurethane, to provide a porous polymer structure.

The porous polymer structure typically serves as the body of the polishing pad and usually provides a polishing surface, which contacts the surface of the substrate during polishing. The porous polymer structure, therefore, preferably comprises a surface texture to facilitate the absorption and/or transport of slurry across the polishing surface of the pad. Preferably, the porous polymer structure comprises an intrinsic surface texture that allows the surface to adsorb and/or transport polishing slurry. The term "intrinsic surface texture" refers to a surface texture that arises from the nature of the composition as opposed to texture that is produced by external processes. For example, a porous polyurethane pad may have an intrinsic surface texture as a consequence of the exposed pore structure on the pad surface. In addition to, or instead of, the intrinsic surface texture, the porous polymer structure can comprise a surface texture produced by external processes (i.e., extrinsic surface texture), such as are known in the art (e.g., embossing, stamping, cutting or abrading, etc.). The porous polymer structure of the present invention preferably comprises sufficient intrinsic and/or extrinsic surface texture to facilitate the absorption and/or transport of slurry across the surface of the pad.

Preferably, the porous polymer structure is substantially or entirely opaque prior to being compressed. According to the present invention, a portion of the porous polymer structure is compressed to provide a portion of the polymer that is at least translucent. The term "at least translucent," as used herein, refers to the ability to transmit at least a portion of the light contacting the surface of the pad and can be used to describe slightly, partially, substantially, and completely translucent or transparent materials. The translucent region of the present inventive polishing pad is preferably at least translucent to light having a wavelength of about 390–3500 nm, more preferably visible light, most preferably visible light from a laser light source, particularly as used in a polishing device to be used with the polishing pad.

Without wishing to be bound by any particular theory, it is believed that the air or gas filled pores or voids (i.e., micropores or microvoids) within the porous polymer matrix of the porous polymer structure cause light passing through to scatter, thereby reducing the translucency of the porous polymer structure or rendering the porous polymer structure opaque. It is further believed that compressing the porous polymer structure reduces the light-scattering effects of the gas-filled pores or voids by reducing or eliminating the porosity of porous polymer structure. As a result, the compressed porous polymer structure has an increased light transmittance (i.e., decreased level of light scattering and increased translucence) as compared to the porous polymer structure prior to compression.

As will be appreciated by those of ordinary skill in the art, the degree of translucence provided in this manner will depend, at least in part, on the degree to which the porous polymer structure is compressed (i.e., the degree to which the porosity of the porous polymer structure is reduced). For example, the porous polymer structure can be compressed by about 10–50% (e.g., about 20–40%) of its thickness prior to compression (i.e., the non-compressed thickness of the porous polymer). However, the porosity of the porous polymer structure need not be completely eliminated in order to provide a translucent region. For example, a region of the porous polymer structure can be compressed to a degree sufficient to provide a translucent region while retaining some degree of porosity. For certain applications, it is preferable to retain sufficient porosity in the compressed, translucent region of the porous polymer structure to allow the absorption of fluid or slurry (e.g., polishing fluid or polishing slurry) into and/or through the compressed, translucent polymer region. The porous polymer also can be compressed to provide a translucent region, whereby the pores of the translucent region are substantially or completely eliminated.

Compression of the porous polymer structure according to the present invention can be performed in any suitable manner known in the art. As those of ordinary skill in the art will appreciate, the most effective technique of compression will depend, at least in part, on the particular porous polymer used and the degree of compression desired for the particular application. The porous polymer structure can, for example, be compressed using calender rollers or various pressing mechanisms known in the art (e.g., a platen press, stamping machine, etc.). Furthermore, heat can be used, either alone or in conjunction with other compression techniques, to achieve a compressed structure. For example, the polymer can be heated to a temperature approaching, meeting, or exceeding its softening or melting temperature (e.g., within about 50° C. of its softening or melting temperature, or about 10–50° C. above its softening or melting temperature) for a period of time sufficient to allow the pores of a region of the porous polymer structure to collapse under the weight of the polymer itself. Alternatively, heat can be applied to the porous polymer structure before, during, or after compressing the porous polymer structure using another compression technique. For example, a heated press or heated rollers can be used to compress a region of the porous polymer structure. When using heat in conjunction with another compression technique to compress the porous polymer structure, the porous polymer structure preferably is heated to a temperature that approaches, meets, or exceeds the softening or melting temperature of the porous polymer.

The compression of the porous polymer ordinarily results in the translucent portion (i.e., the compressed portion) having a thickness that is less than the thickness of the porous polymer structure prior to compression. In certain applications, it may be desirable to reduce or eliminate this effect. One way of reducing the thinning effect of the compression step is to use a space-filling material, such as a space-filling polymer. In practice, the space filling material can be placed over the portion of the porous polymer structure to be compressed, thereby creating a pre-compressed region that is thicker than the porous polymer structure alone. The space-filling material and porous polymer substrate are then compressed to any desired thickness (e.g., the thickness of the porous polymer structure prior to compression).

The space-filling material can be any material capable of being placed over the porous polymer structure and compressed to create a translucent region. The space-filling material (e.g., polymer) preferably bonds with the porous polymer structure through compression (e.g., fusing) so as to create a single, continuous translucent layer. The space-filling material can, for example, be the same material as the porous polymer.

Compression of a portion of the porous polymer structure to provide a portion that is at least translucent also can be performed in conjunction with a filler material. The filler material, typically, occupies a portion of the pores of the porous polymer structure, thereby increasing the translucence of the porous polymer structure by replacing the gas or air in the pores of the porous polymer structure with a material that has a refractive index more similar to the refractive index of the porous polymer. According to this aspect of the invention, a filler can be introduced into a portion of the pores of the porous polymer structure to provide a filled porous polymer structure having a reduced porosity. The filled porous polymer structure can then be compressed to provide a region that is at least translucent. The filler can comprise, consist essentially of, or consist of any suitable material. Suitable fillers include, for example, organic compounds, such as fats, oils, natural resins, etc. Other suitable fillers include synthetic polymers and resins, such as epoxy resins, thermosetting resins, UV-setting resins, photo-setting resins, and mixture thereof. More specific examples of suitable fillers for use in conjunction with the present invention include polyesters, styrenes, acrylics, acrylates, methyacrylates, polycarbonates, ethylcyanoacrylates, and derivatives and mixtures thereof. A preferred filler material comprises, consists essentially of, or consists of polyester.

Although the polishing pad of the present invention can be translucent in its entirety, the polishing pad preferably comprises a substantially or entirely opaque region in addition to the translucent region. As previously mentioned, the porous polymer structure is preferably substantially or entirely opaque prior to being compressed. Thus, a non-compressed region of the porous polymer structure typically provides the substantially or entirely opaque region such that the substantially or entirely opaque region and the translucent region comprise a continuous polymeric structure.

The substantially or entirely opaque region, however, can comprise a material that is different (e.g., having different chemical and/or physical characteristics) from the porous polymer structure used to provide the translucent region. For example, the substantially or entirely opaque region and the porous polymer structure used to provide the translucent region can comprise different types of polymers. Alternatively, the substantially or entirely opaque region can be provided by a material that comprises the same kind of polymer as the porous polymer structure used to provide the translucent region (e.g., polyurethane), but which has one or more different physical properties (e.g., different density, hardness, porosity, air or liquid permeability, etc.). For example, the substantially or entirely opaque region can be provided by a porous polymer structure formed from sintered polyurethane particles having a particle size of 1–250 $\mu$m and the transparent region can be provided using a porous polymer structure formed from sintered polyurethane particles having a particle size of 250–1000 $\mu$m, which materials would have different physical characteristics.

Suitable materials for forming the opaque region are generally known in the art and include commonly used polishing pad materials such as porous or non-porous polyurethane, nylon, acrylic, and the like. Also, as previously discussed with respect to the porous polymer structure, the substantially opaque region of the polishing pad preferably comprises an intrinsic surface texture and/or an extrinsic surface texture to facilitate the absorption and/or transport of slurry across the surface of the pad.

The translucent region can be formed as part of a polishing pad, or the translucent region can be pre-formed and mated to a second structure to provide a polishing pad. The second structure can comprise any suitable polishing pad material known in the art, including any of the materials identified herein, which can the same or different from that of the translucent region. For example, the translucent region can be pre-formed in a desired size and shape and inserted into an aperture of like size and shape in a second polymer structure (e.g., a substantially or entirely opaque material) to provide a polishing pad.

In addition to the features discussed herein, the porous polymer structure (compressed or uncompressed), opaque regions, or other parts of the polishing pad can comprise other elements, ingredients, or additives, such as backings, adhesives, abrasives, and other additives known in the art. The compressed (i.e., translucent) or uncompressed region of the porous polymer structure can comprise, for example, a light absorbing or reflecting element, such as an ultraviolet or color adsorbing or reflecting material, that enables the passage of certain wavelengths of light, while retarding or eliminating the passage of other wavelengths of light.

The polishing pad comprising the translucent region can be formed by any method known in the art. Suitable methods include casting, cutting, injection molding, or pressing the porous polymer into the desired polishing pad shape. Such forming of the polishing pad can take place before, during, or after the compression of at least a region of the porous polymer structure to provide a translucent region. Other polishing pad elements also can be added to the porous polymer before, during, or after shaping the porous polymer, as desired. For example, backing materials can be applied, holes can be drilled, or surface textures can be provided, by various methods generally known in the art. Alternatively, the translucent region formed from the porous polymer according to the present invention can be inserted into another material before, during or after forming a polishing pad from the other material. For example, part of a commercially available polishing pad can be removed and the translucent region can be inserted into the polishing pad. Preferably, a macro- or micro-texture is provided on at least a portion of the surface of the polishing pad or porous polymer.

The present invention also provides a method of polishing a substrate comprising the use of a polishing pad of the present invention, for example, by contacting the polishing pad with the surface of the substrate and moving the polishing pad relative to the surface of the substrate, optionally in the presence of a polishing fluid or slurry. The present method of polishing a substrate can be used to polish or planarize any substrate, for example, a substrate comprising a glass, metal, metal oxide, metal composite, semiconductor base material, or combinations thereof. The substrate can comprise, consist essentially of, or consist of any suitable metal. Suitable metals include, for example, copper, aluminum, tantalum, titanium, tungsten, gold, platinum, iridium, ruthenium, and combinations (e.g., alloys or mixtures) thereof. The substrate also can comprise, consist essentially of, or consist of any suitable metal oxide. Suitable metal oxides include, for example, alumina, silica, titania, ceria, zirconia, germania, magnesia, and combinations thereof. In addition, the substrate can comprise, consist essentially of, or consist of any suitable metal composite. Suitable metal composites include, for example, metal nitrides (e.g., tantalum nitride, titanium nitride, and tungsten nitride), metal carbides (e.g., silicon carbide and tungsten carbide), nickel-phosphorus, alumino-borosilicate, borosilicate glass, phosphosilicate glass (PSG), borophosphosilicate glass (BPSG), silicon/germanium alloys, and silicon/germanium/carbon alloys. The substrate also can comprise, consist essentially of, or consist of any suitable semiconductor base material. Suitable semiconductor base materials include single-crystal silicon, poly-crystalline silicon, amorphous silicon, silicon-on-insulator, and gallium arsenide.

The present inventive method is useful in the planarizing or polishing of many hardened workpieces, such as memory or rigid disks, metals (e.g., noble metals), inter-layer dielectric (ILD) layers, micro-electro-mechanical systems, ferroelectrics, magnetic heads, polymeric films, and low and high dielectric constant films. The term "memory or rigid disk" refers to any magnetic disk, hard disk, rigid disk, or memory disk for retaining information in electromagnetic form. Memory or rigid disks typically have a surface that comprises nickel-phosphorus, but the surface can comprise any other suitable material.

The present inventive method is especially useful in polishing or planarizing a semiconductor device, for example, semiconductor devices having device feature geometries of about 0.25 $\mu$m or smaller (e.g., 0.18 $\mu$m or smaller). The term "device feature" as used herein refers to a single-function component, such as a transistor, resistor, capacitor, integrated circuit, or the like. The present method can be used to polish or planarize the surface of a semiconductor device, for example, in the formation of isolation structures by shallow trench isolation methods (STI polishing), during the fabrication of a semiconductor device. The present method also can be used to polish the dielectric or metal layers (i.e., metal interconnects) of a semiconductor device in the formation of an inter-layer dielectric (ILD polishing).

The present inventive method of polishing a substrate can further comprise passing light through the translucent region of the polishing pad and onto a surface of the substrate, for example, during the polishing or planarizing of a substrate in order to inspect or monitor the polishing process. Techniques for inspecting and monitoring the polishing process by analyzing light or other radiation reflected from a surface of the substrate are known in the art. Such methods are described, for example, in U.S. Pat. No. 5,196,353, U.S. Pat. No. 5,433,651, U.S. Pat. No. 5,609,511, U.S. Pat. No. 5,643,046, U.S. Pat. No. 5,658,183, U.S. Pat. No. 5,730,642, U.S. Pat. No. 5,838,447, U.S. Pat. No. 5,872,633, U.S. Pat. No. 5,893,796, U.S. Pat. No. 5,949,927, and U.S. Pat. No. 5,964,643. All of the references cited herein, including patents, patent applications, and publications, are hereby incorporated in their entireties by reference.

While this invention has been described with an emphasis upon preferred embodiments, those of ordinary skill in the art will appreciate that variations of the preferred embodiments can be used, and it is intended that the invention may be practiced otherwise than as specifically described herein. Accordingly, this invention includes all modifications encompassed within the spirit and scope of the invention as defined by the following claims.

What is claimed is:

1. A method for producing a polishing pad comprising
   (a) providing a porous polymer structure;
   (b) compressing a region of the porous polymer structure to provide a translucent region; and
   (c) forming a polishing pad comprising the porous polymer structure, a wherein the polishing pad so produced comprises the translucent region and a substantially opaque region provided by a non-compressed region of the porous polymer structure.

2. The method of claim 1 further comprising heating the porous polymer structure.

3. The method of claim 2, wherein the porous polymer structure is heated to a temperature within about 50° C. of its melting temperature.

4. The method of claim 3, wherein the porous polymer structure is heated to a temperature about 10–50° C. above its melting temperature.

5. The method of claim 1, wherein the porous polymer structure is compressed by about 10–50% of its thickness prior to compression.

6. The method of claim 5, wherein the porous polymer structure is compressed by about 20–40% of its thickness prior to compression.

7. The method of claim 1, wherein the porous polymer structure is opaque prior to the compression step.

8. The method of claim 1, wherein the porous polymer structure comprises a thermoplastic.

9. The method of claim 8, wherein the porous polymer structure comprises polyurethane.

10. The method of claim 1 further comprising mating the translucent region to a second polymer structure.

11. The method of claim 1, wherein the substantially opaque region is provided by a material that is different from the porous polymer structure.

12. The method of claim 1, wherein the translucent region is thinner than the substantially opaque region.

13. The method of claim 1, further comprising overlaying the region of the porous polymer structure to be compressed with a space-filling material prior to compressing.

14. The method of claim 13, wherein the porous polymer structure and space-filling material overlaid thereupon are compressed to a thickness about equal to that of the porous polymer structure prior to compressing.

15. The method of claim 14, wherein the space-filling material is the same as the porous polymer.

16. The method of claim 1, wherein the porous polymer structure comprises an intrinsic surface texture.

17. The method of claim 16, wherein the translucent region comprises an intrinsic surface texture.

18. The method of claim 1, further comprising providing an extrinsic surface texture on at least a portion of the surface of the polishing pad.

19. The method of claim 1, wherein the translucent region is translucent to light having a wavelength of about 190–3500 nm.

20. A polishing pad comprising a porous polymer structure, the pad comprising a region that is at least translucent and a substatially opaque region, wherein the translucent region is sufficiently porous to absorb or transport a polishing slurry, and wherein at least a portion of the substantially opaque region of the polishing pad is provided by a non-compressed region of the porous polymer structure.

21. The polishing pad of claim 20, wherein at least a portion of the substantially opaque region of the polishing pad is provided by a material that is different from the porous polymer structure.

22. A method of polishing a substrate comprising
  (i) contacting a substrate with a polishing pad produced by a method comprising:
    (a) providing a porous polymer structure;
    (b) compressing a region of the porous polymer structure to provide a translucent region; and
    (c) forming a polishing pad comprising the porous polymer structure, a wherein the polishing pad so produced comprises the translucent region and a substantially opaque region provided by a non-compressed region of the porous polymer structure, and
  (ii) moving the substrate and polishing pad relative to each other.

23. The method of claim 22, wherein the substrate is a semiconductor device.

24. The method of claim 23 further comprising passing light through the translucent region of the polishing pad to evaluate the polishing of the substrate.

25. The method of claim 24, wherein the light is a laser light.

26. A method of polishing a substrate comprising (i) contacting a substrate with a polishing a porous polymer structure, the pad comprising a region that is at least translucent and a substantially opaque region, wherein the translucent region is sufficiently porous to absorb or transport a polishing slurry, and wherein at least a portion of the substantially opaque region of the polishing pad is provided by a non-compressed region of the porous polymer structure, and (ii) moving the substrate and polishing pad relative to each other.

27. The method of claim 26, wherein the substrate is a semiconductor device.

28. The method of claim 27, further comprising passing light through the translucent region of the polishing pad to evaluate the polishing of the substrate.

29. The method of claim 28, wherein the light is a laser light.

* * * * *